United States Patent
Tamura

(10) Patent No.: US 9,455,780 B2
(45) Date of Patent: Sep. 27, 2016

(54) OPTICAL TRANSMISSION SYSTEM AND OPTICAL RECEIVING APPARATUS

(71) Applicant: FUJITSU LIMITED, Kawasaki-shi, Kanagawa (JP)

(72) Inventor: Yuji Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/619,370

(22) Filed: Feb. 11, 2015

(65) Prior Publication Data

US 2015/0256251 A1  Sep. 10, 2015

(30) Foreign Application Priority Data

Mar. 4, 2014  (JP) ................................. 2014-042176

(51) Int. Cl.
| | |
|---|---|
| *H04B 10/08* | (2006.01) |
| *H04B 10/077* | (2013.01) |
| *H04B 10/25* | (2013.01) |
| *H04B 10/071* | (2013.01) |

(52) U.S. Cl.
CPC ........ *H04B 10/0771* (2013.01); *H04B 10/071* (2013.01); *H04B 10/25* (2013.01)

(58) Field of Classification Search
CPC .............. H04B 10/0771; H04B 10/25; H04B 10/2503; H04B 10/07; H04B 10/071
USPC ........ 398/33, 38, 16, 13, 17, 10, 21, 22, 23, 398/24, 25, 26, 27, 79; 356/73.1
See application file for complete search history.

(56) References Cited

U.S. PATENT DOCUMENTS

| | | | | |
|---|---|---|---|---|
| 5,177,354 A | * | 1/1993 | Tomita | G02B 6/29368 250/227.15 |
| 7,684,702 B2 | * | 3/2010 | Lu | H04B 10/0773 398/33 |
| 2008/0002971 A1 | * | 1/2008 | Genay | G01M 11/319 398/17 |
| 2009/0169203 A1 | | 7/2009 | Hakomori | |
| 2009/0202238 A1 | * | 8/2009 | Straub | H04B 10/27 398/25 |

FOREIGN PATENT DOCUMENTS

| | | |
|---|---|---|
| JP | 5-128397 | 5/1993 |
| JP | 2009-159293 | 7/2009 |

* cited by examiner

*Primary Examiner* — Hanh Phan
(74) *Attorney, Agent, or Firm* — Fujitsu Patent Center

(57) ABSTRACT

An optical transmission system includes an optical transmission apparatus and an optical receiving apparatus. The optical transmission apparatus includes a transmitting unit that transmits signal light to the optical receiving apparatus through an optical transmission path, and a determining unit that determines continuity of the optical path using return light that returns from the optical receiving apparatus to the optical transmission apparatus through the optical transmission path, out of the signal light. The optical transmission apparatus includes a modulating unit that modulates a part of the signal light that is transmitted from the optical transmission apparatus through the optical transmission path to generate the return light, and an output unit that outputs the return light to the optical transmission apparatus through the optical transmission path.

6 Claims, 13 Drawing Sheets

OPTICAL TRANSMISSION SYSTEM AND OPTICAL RECEIVING APPARATUS

CROSS-REFERENCE TO RELATED APPLICATION

This application is based upon and claims the benefit of priority of the prior Japanese Patent Application No. 2014-042176, filed on Mar. 4, 2014, the entire contents of which are incorporated herein by reference.

FIELD

The embodiments discussed herein are directed to an optical transmission system and an optical receiving apparatus.

BACKGROUND

Conventionally, in optical transmission systems, various determination methods of determining continuity of optical transmission paths such as optical fibers that connect between devices have been studied. As such a determination method, for example, a determination method using Fresnel reflection has been known.

In the determination method using Fresnel reflection, a level of signal light transmitted from an optical transmission apparatus to an optical receiving apparatus through an optical fiber, and a level of reflection light that reflects toward the optical transmission apparatus by Fresnel reflection caused by a break in an optical fiber or disconnection of an optical connector are compared. In the determination method using Fresnel reflection, continuity of an optical transmission path is determined based on a result of comparison between the level of the signal light and the level of the reflection light (Japanese Laid-open Patent Publication No. 05-128397).

However, in the conventional technique described above, there has been a problem that it is difficult to determine continuity of an optical transmission path accurately.

Specifically, in the conventional technique described above, even when an optical transmission path is conducting, when a flaw or an adherent is present on a surface of an end of a connector of the optical transmission path, it is considered that unexpected reflection light can occur by Fresnel reflection originated in the flaw or the adherent. In such a case, a level of signal light and a level of reflection light occurred by Fresnel reflection originated in the flaw or the adherent are compared in the conventional technique described above, it can be incorrectly determined that the optical transmission path is not conducting even though the optical transmission path is conducting.

On the other hand, in the conventional technique described above, when an optical transmission path is not conducting due to a break of an optical fiber, confusion occurs on a broken surface of the optical fiber, and it is considered that a level of reflection light is reduced by the confusion. In such a case, a level of a signal light and the level of the reflection light that is reduced by the confusion are compared in the conventional technique, and therefore, it can be incorrectly determined that the optical transmission path is conducting even though the optical transmission path is not conducting.

SUMMARY

According to an aspect of an embodiment, an optical transmission system includes an optical transmission apparatus; and an optical receiving apparatus, wherein the optical transmission apparatus includes a transmitting unit that transmits signal light to the optical receiving apparatus that is connected to the optical transmission apparatus through an optical transmission path; and a determining unit that determines continuity of the optical transmission path using return light out of the signal light, the return light returning from the optical receiving apparatus to the optical transmission apparatus through the optical transmission path, and the optical receiving apparatus includes a modulating unit that modulates a part of the signal light that is transmitted from the optical transmission apparatus; and an output unit that outputs modulation light that is obtained by the part of the signal light being modulated to the optical transmission apparatus as the return light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed techniques are not limited to these embodiments.

[a] First Embodiment

Figure 1:
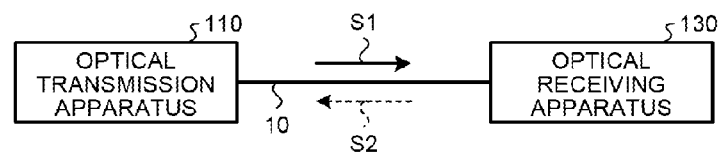
FIG. 1 is an explanatory diagram explaining an example of operation of an optical transmission system according to a first embodiment.

First, an example of operation of an optical transmission system according to a first embodiment is explained using FIG. 1. FIG. 1 is an explanatory diagram explaining an example of operation of the optical transmission system according to the first embodiment. The optical transmission system indicated in FIG. 1 includes an optical transmission apparatus 110 and an optical receiving apparatus 130 that are connected through an optical fiber 10.

As indicated in FIG. 1, the optical transmission apparatus 110 transmits a signal light S1 to the optical receiving apparatus 130 that is connected to the optical transmission apparatus 110 through the optical fiber 10.

Meanwhile, the optical receiving apparatus 130 modulates a part of the signal light S1 transmitted from the optical transmission apparatus 110. The optical receiving apparatus 130 then outputs a modulation light S2 that is obtained by modulating a part of the signal light S1, to the optical transmission apparatus 110 through the optical fiber 10. The modulation light S2 is one example of return light that is light returning to the optical transmission apparatus 110 from the optical receiving apparatus 130 through the optical fiber 10 out of the signal light S1.

Subsequently, the optical transmission apparatus 110 determines continuity of the optical fiber 10 using the modulation light S2 that returns to the optical transmission apparatus 110 as return light. For example, the optical transmission apparatus 110 extracts, from the modulation light S2, voltage that is proportional to amplitude of the modulation light S2, compares a value of the extracted voltage with a predetermined reference value, and determines that the optical fiber 10 is conducting when the value of the voltage is larger than the predetermined reference value. On the other hand, the optical transmission apparatus 110 determines that the optical fiber 10 is not conducting when the value of the extracted voltage is equal to or smaller than the predetermined reference value. In this case, a state of the optical fiber 10 being not conducting includes, for example, occurrence of disconnection of an optical connector to connect the optical fiber 10, and a break of the optical fiber 10.

As described, in the optical transmission system of the first embodiment, the optical receiving apparatus 130 modulates a part of the signal light S1 transmitted from the optical transmission apparatus 110, and outputs the modulation light S2 to the optical transmission apparatus 110 as return light. The optical transmission apparatus 110 then uses the modulation light S2 as return light to determine continuity of the optical fiber 10. Therefore, according to the first embodiment, it is possible to determine continuity of the optical fiber 10 accurately regardless of occurrence of a break of an optical fiber or disconnection of an optical connector, compared to the conventional determination method using Fresnel reflection caused by a break of the optical fiber 10 or disconnection of an optical connector.

Figure 2:
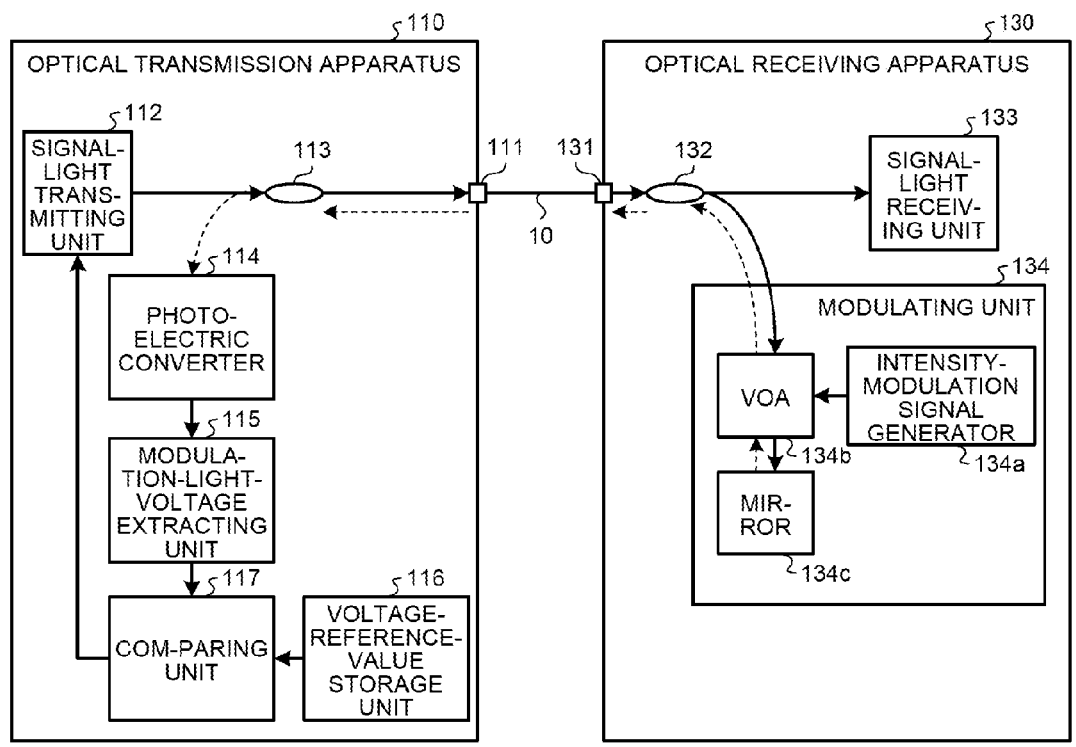
FIG. 2 indicates a configuration example of an optical transmission apparatus and an optical receiving apparatus that are included in the optical transmission system according to the first embodiment.

Next, a configuration example of the optical transmission apparatus 110 and the optical receiving apparatus 130 that are included in the optical transmission system according to the first embodiment is explained using FIG. 2. FIG. 2 indicates a configuration example of the optical transmission apparatus and the optical receiving apparatus that are included in the optical transmission system according to the first embodiment.

As indicated in FIG. 2, the optical transmission apparatus 110 includes an optical connector 111, a signal-light transmitting unit 112, an optical coupler 113, a photoelectric converter 114, a modulation-light-voltage extracting unit 115, a voltage-reference-value storage unit 116, and a comparing unit 117.

The optical connector 111 is a connector to which the optical fiber 10 is connected. The optical connector 111 outputs the signal light S1 input from the optical coupler 113 to the optical fiber 10. Moreover, when receiving input of the modulation light S2 that returns to the optical transmission apparatus 110 as return light from the optical fiber 10, the optical connector 111 outputs the input modulation light S2 to the optical coupler 113.

The signal-light transmitting unit 112 transmits the signal light S1 to the optical receiving apparatus 130 that is connected to the optical transmission apparatus 110 through the optical fiber 10. For example, the signal-light transmitting unit 112 transmits the signal light S1 to the optical receiving apparatus 130 through the optical coupler 113 and the optical connector 111. Furthermore, the signal-light transmitting unit 112 reduces the level of the signal light S1 based on an instruction from the comparing unit 117.

The optical coupler 113 outputs the signal light input from the signal-light transmitting unit 112 to the optical connector 111. Moreover, when receiving input of the modulation light S2 that returns to the optical transmission apparatus 110 from the optical receiving apparatus 130 as return light from the optical connector 111, the optical coupler 113 branches the input modulation light S2 and outputs the branched modulation light S2 to the photoelectric converter 114.

The photoelectric converter 114 converts the modulation light S2 input from the optical coupler 113 into an electric signal, and outputs the modulation light S2 converted into an electric signal to the modulation-light-voltage extracting unit 115.

The modulation-light-voltage extracting unit 115 extracts voltage (hereinafter, "modulation light voltage") that is proportional to amplitude of the modulation signal S2, from the modulation light S2 that is input from the photoelectric converter 114 and that has been converted into an electric signal. For example, the modulation-light-voltage extracting unit 115 extracts the modulation light voltage of the modulation light S2 using a band-pass filter having a transmission band that transmits the modulation light S2, and a peak detector that detects peak voltage of output of the band-pass filter.

The voltage-reference-value storage unit 116 stores a voltage reference value that is a reference value of modulation light voltage, to determine continuity of the optical fiber 10.

The comparing unit 117 compares a value of the modulation light voltage extracted by the modulation-light-voltage extracting unit 115 with the voltage reference value stored in the voltage-reference-value storage unit 116, and outputs a result of the comparison to a not illustrated display unit as a determination result of continuity of the optical fiber 10. Specifically, the comparing unit 117 outputs a determination result that the optical fiber 10 is conducting to the display unit when the value of the modulation light voltage is larger than the voltage reference value. On the other hand, the comparing unit 117 outputs a determination result that the optical fiber 10 is not conducting to the display unit when the value of the modulation light voltage is equal to or smaller than the voltage reference value. Furthermore, when the value of the modulation light voltage is equal to or smaller than the voltage reference value, the comparing unit 117 instructs the signal-light transmitting unit 112 to reduce the level of the signal light S2. The optical coupler 113, the photoelectric converter 114, the modulation-light-voltage extracting unit 115, and the comparing unit 117 are an example of a determining unit that determines continuity of an optical transmission path using return light.

The optical receiving apparatus 130 includes an optical connector 131, an optical coupler 132, a signal-light receiving unit 133, and a modulating unit 134.

The optical connector 131 is a connector to which the optical fiber 10 is connected. When receiving input of the signal light S1 from the optical fiber 10, the optical connector 131 outputs the input signal light S1 to the optical coupler 132. Moreover, the optical connector 131 outputs the modulation light S2 that is input from the optical coupler 132, to the optical fiber 10.

The optical coupler 132 branches the signal light S1 input from the optical connector 131, and outputs one of signal lights that are obtained as a result of branching to the signal-light receiving unit 133, and outputs the other one of the signal lights that are obtained as a result of branching (hereinafter, "branched light") to the modulating unit 134. Furthermore, the optical coupler 132 outputs the modulation light S2 that is input from the modulating unit 134 to the optical connector 131 as return light. The modulation light S2 output to the optical connector 131 by the optical coupler 132 is output to the optical transmission apparatus 110 through the optical fiber 10. The optical coupler 132 is an example of an output unit that outputs the modulation light S2 to the optical transmission apparatus 110 as return light.

The signal-light receiving unit 133 receives signal light that is input from the optical coupler 132, and performs predetermined signal processing on the received signal light.

The modulating unit 134 modulates a part of the signal light S2 that is transmitted from the optical transmission apparatus 110. Specifically, the modulating unit 134 includes an intensity-modulation signal generator 134a, a variable optical attenuator (VOA) 134b, and a mirror 134c.

The intensity-modulation signal generator 134a generates an intensity modulation signal that is an electric signal to perform intensity modulation on signal light, and outputs the generated intensity modulation signal to the VOA 134b. The intensity modulation signal generated by the intensity-modulation signal generator 134a is an electric signal having a frequency sufficiently lower than that of the signal light, and is an electric signal that repeats attenuation or amplification at predetermined time intervals.

The VOA 134b performs intensity modulation on branched light that is input from the optical coupler 132 using the intensity modulation signal input from the intensity-modulation signal generator 134a. Specifically, the VOA 134b attenuates or amplifies the branched light at predetermined time intervals according to the intensity modulation signal, to modulate the intensity of the branched light. The VOA 134b then outputs the branched light subjected to intensity modulation to the mirror 134c. When receiving input of the branched light that is reflected by the mirror 134c, the VOA 134b attenuates or amplifies the branched light at predetermined time intervals according to the intensity modulation signal, to modulate the intensity of the branched light. That is, the VOA 134b modulates the intensity of the branched light only twice. The VOA 134b then outputs the branched light finally subjected to the intensity modulation to the optical coupler 132 as the modulation signal S2.

The mirror 134c reflects the branched light input from the VOA 134b to the VOA 134b.

Figure 3:
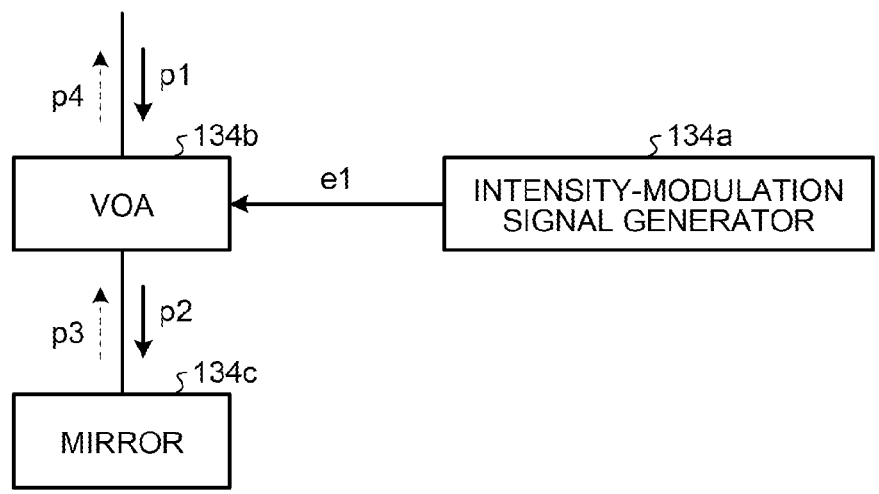
FIG. 3 is a diagram for explaining an example of a return-light output processing in the first embodiment.
Figure 4:
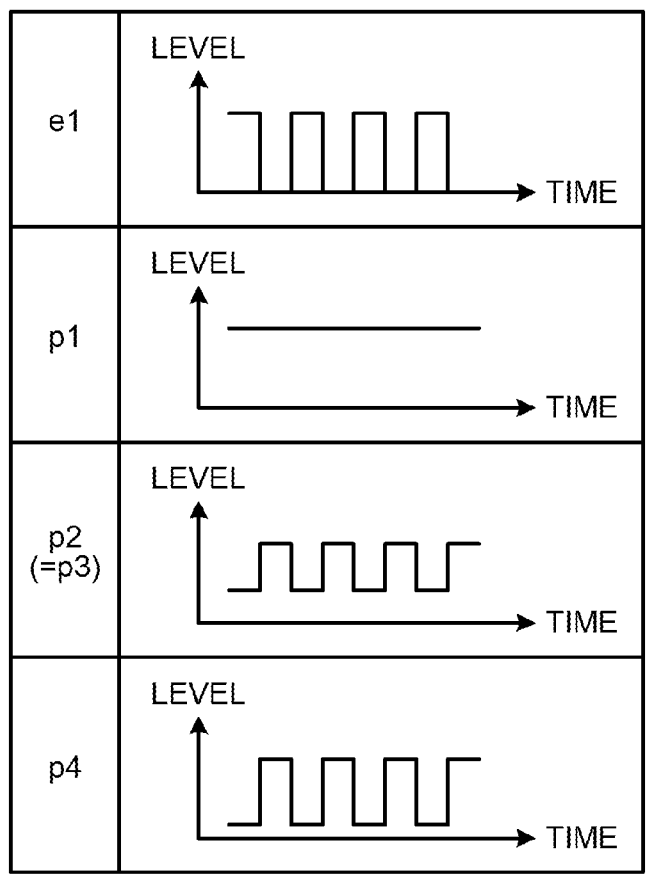
FIG. 4 indicates a waveform of each signal that is applied to the return-light output processing in the first embodiment.

An example of return-light output processing performed by the modulating unit 134 is explained. FIG. 3 is a diagram for explaining an example of the return-light output processing in the first embodiment. FIG. 4 indicates a waveform of each signal that is applied to the return-light output processing in the first embodiment.

The intensity-modulation signal generator 134a of the modulating unit 134 generates an intensity modulation signal e1 as indicated in FIG. 3, and outputs the generated intensity modulation signal e1 to the VOA 134b. The intensity modulation signal e1 has a frequency sufficiently lower than the signal light, and therefore repeats attenuation or amplification at predetermined time intervals.

Subsequently, the VOA 134b of the modulating unit 134 modulates the intensity of branched light p1 by attenuating or amplifying the branched light p1 at predetermined time intervals according to the intensity modulation signal e1 input from the intensity-modulation signal generator 134a. The VOA 134b outputs the branched light p1 subjected to the intensity modulation (hereinafter, "branched light p2") to the mirror 134c as indicated in FIG. 3. The branched light p1 has frequency sufficiently higher than the intensity modulation signal e1 as indicated in FIG. 4, and therefore is constant with respect to a time axis. The branched light p2 repeats attenuation or amplification at the same time intervals as those of the intensity modulation signal e1.

Subsequently, the mirror 134c of the modulating unit 134 reflects the branched light p2 input from the VOA 134b to the VOA 134b. The branched light p2 reflected by the mirror 134c (hereinafter, "branched light p3") has a different traveling direction from that of the branched light p2 input from the VOA 134b.

Subsequently, the VOA 134b of the modulating unit 134 performs following processing when the branched light p3 is input from the mirror 134c. Specifically, the VOA 134b performs intensity modulation on the branched light p3 by attenuating or amplifying the branched light p3 at predetermined time intervals according to the intensity modulation signal e1 input from the intensity-modulation signal generator 134a. The VOA 134b then outputs the branched light p3 subjected to the intensity modulation (hereinafter, "branched light p4") to the optical coupler 132 as the modulation light S2 as indicted in FIG. 3. The branched light p4 has larger amplitude compared to the branched light p2 and the branched light p3 as indicated in FIG. 4.

As described, the modulating unit 134 modulates the intensity of the branched light input from the optical coupler 132 only twice using the intensity modulation signal, and outputs the branched light subjected to the intensity modulation only twice as the modulation light S2 to the optical coupler 132. The modulation light S2 is output to the optical transmission apparatus 110 by the optical coupler 132 as return light.

Figure 5:
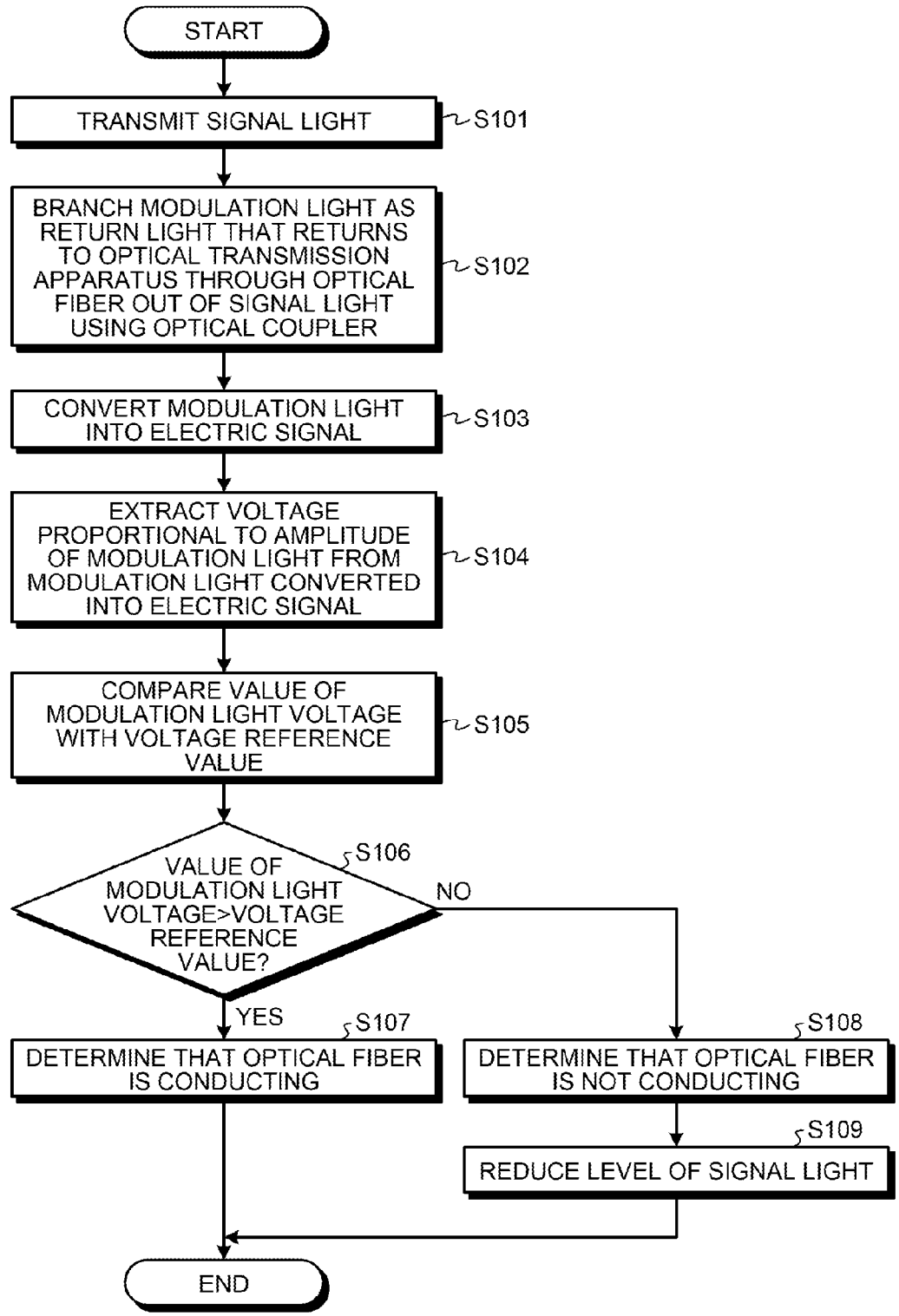
FIG. 5 is a flowchart indicating a processing procedure of a continuity determination processing performed by the optical transmission apparatus in the first embodiment.

Next, an example of continuity determination processing performed by the optical transmission apparatus 110 in the first embodiment is explained using FIG. 5. FIG. 5 is a flowchart indicating a processing procedure of the continuity determination processing performed by the optical transmission apparatus in the first embodiment.

As indicated in FIG. 5, the signal-light transmitting unit 112 of the optical transmission apparatus 110 transmits the signal light S1 to the optical receiving apparatus 130 that is connected to the optical transmission apparatus 110 through the optical fiber 10 (step S101).

The optical coupler 113 branches the modulation light S2 as return light that returns to the optical transmission apparatus 110 from the optical receiving apparatus 130 (step S102). The optical coupler 113 outputs the branched modulation light S2 to the photoelectric converter 114.

The photoelectric converter 114 converts the modulation light S2 that is input from the optical coupler 113 into an electric signal (step S103). The photoelectric converter 114 outputs the modulation light S2 that has been converted into an electric signal to the modulation-light-voltage extracting unit 115.

The modulation-light-voltage extracting unit 115 extracts, from the modulation light S2 converted into an electric signal, voltage that is proportional to amplitude of the modulation light S2, that is, the modulation light voltage (step S104).

The comparing unit 117 compares a value of the modulation light voltage extracted by the modulation-light-voltage extracting unit 115 with a voltage reference value that is stored in the voltage-reference-value storage unit 116 (step S105). The comparing unit 117 determines that the optical fiber 10 is conducting when the value of the modulation light voltage is larger than the voltage reference value (step S106: YES), and outputs the determination result to the display unit (step S107).

On the other hand, when the value of the modulation light voltage is equal to or smaller than the voltage reference value (step S106: NO), the comparing unit 117 determines that the optical fiber 10 is not conducting, and outputs the determination result to the display unit (step S108). Furthermore, the comparing unit 117 instructs the signal-light transmitting unit 112 to reduce the level of the signal light S1. The signal-light transmitting unit 112 reduces the level of the signal light S1 based on the instruction from the comparing unit 117 (step S109).

Figure 6:
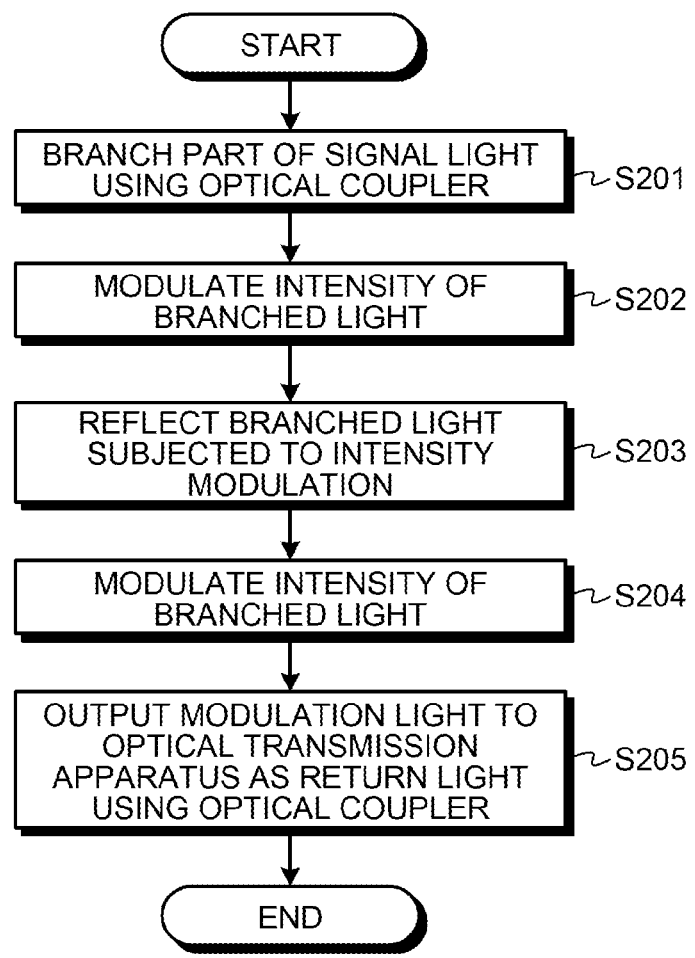
FIG. 6 is a flowchart of a processing procedure of the return-light output processing performed by the optical receiving apparatus in the first embodiment.

Next, an example of return-light output processing performed by the optical receiving apparatus 130 in the first embodiment is explained using FIG. 6. FIG. 6 is a flowchart of a processing procedure of the return-light output processing performed by the optical receiving apparatus in the first embodiment.

As indicated in FIG. 6, the optical coupler 132 of the optical receiving apparatus 130 branches a part of the signal light S1 that is input from the optical connector 131, and outputs the branched light obtained as a result of branching to the modulating unit 134 (step S201).

The VOA 134b of the modulating unit 134 modulates the intensity of the branched light that is input from the optical coupler 132 using the intensity modulation signal input from the intensity-modulation signal generator 134a (step S202).

The mirror 134c reflects the branched light subjected to the intensity modulation by the VOA 134b to the VOA 134b (step S203).

The VOA 134b modulates the intensity of the branched light input from the mirror 134c using the intensity modulation signal input from the intensity-modulation signal generator 134a (step S204). The VOA 134b then outputs the branched light finally subjected to the intensity modulation as the modulation light S2 to the optical coupler 132.

The optical coupler 132 outputs the modulation light S2 input from the modulating unit 134 to the optical transmission apparatus 110 as return light (step S205).

As described above, in the optical transmission system according to the first embodiment, the optical receiving apparatus 130 modulates a part of the signal light S1 that is transmitted from the optical transmission apparatus 110, and outputs the modulation light S2 to the optical transmission apparatus 110 as return light. The optical transmission apparatus 110 determines continuity of the optical fiber 10 using the modulation light S2 as return light. Therefore, according to the first embodiment, it is possible to determine continuity of the optical fiber 10 accurately regardless of occurrence of a break of the optical fiber 10 or disconnection of an optical connector, compared to the conventional determination method using Fresnel reflection caused by a break of the optical fiber 10 or disconnection of an optical connector.

Moreover, in the optical transmission system according to the first embodiment, the optical transmission apparatus 110 extracts voltage proportional to amplitude of the modulation light S2, compares the value of the extracted voltage with a predetermined reference value, and outputs a result of the comparison as a result of determination for continuity of the optical fiber 10. Therefore, according to the first embodiment, it is possible to determine continuity of the optical fiber 10 accurately without using reflection light that occurs by Fresnel reflection.

Moreover, in the optical transmission system according to the first embodiment, the optical transmission apparatus 110 instructs the signal-light transmitting unit 112 to reduce the level of the signal light S1 when a value of voltage that is proportional to amplitude of the modulation light S2 is equal to or smaller than a predetermined reference value. Therefore, according to the first embodiment, it is possible to reduce the level of the signal light S1 to a safe level not affecting human bodies when the optical fiber 10 is not conducting due to a break of the optical fiber 10 or disconnection of an optical connector.

[b] Second Embodiment

Figure 7:
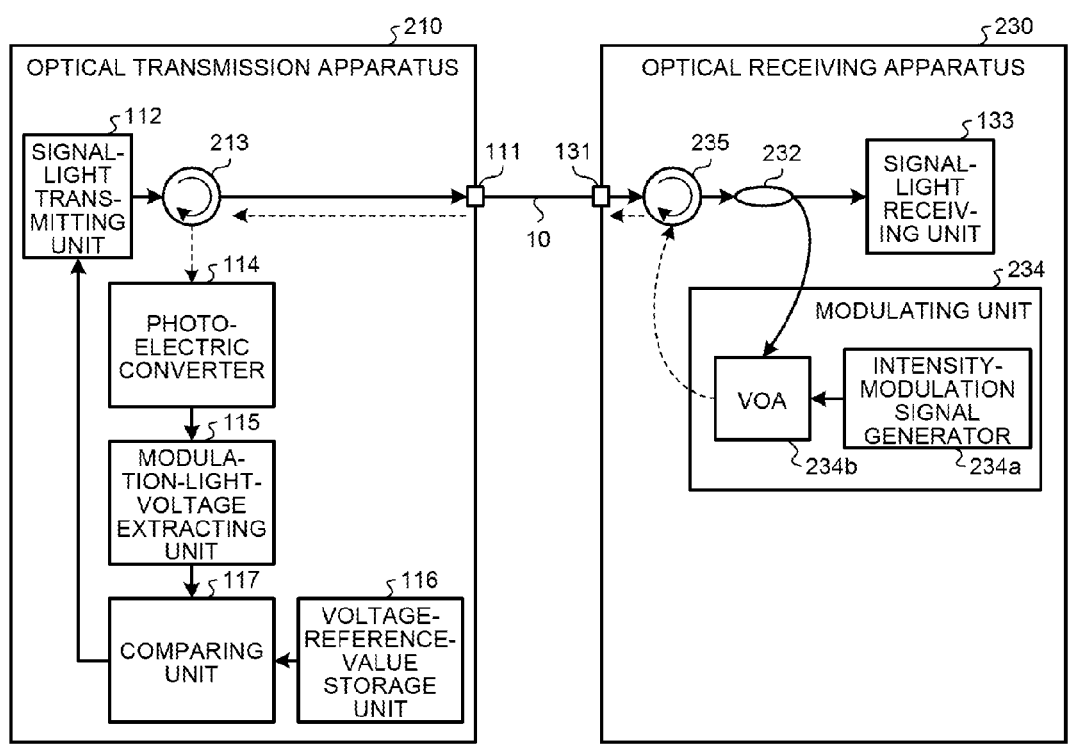
FIG. 7 indicates a configuration example of an optical transmission apparatus and an optical receiving apparatus that are included in an optical transmission system according to a second embodiment.

Next, an optical transmission system according to a second embodiment is explained using FIG. 7. FIG. 7 indicates a configuration example of an optical transmission apparatus and an optical receiving apparatus that are included in the optical transmission system according to the second embodiment. The optical transmission system according to the second embodiment only differs in optical parts to output or branch return light from the optical transmission system according to the first embodiment, and other components are the same as the optical transmission system according to the first embodiment. Accordingly, in the following, like reference symbols are given to components same as the first embodiment, and explanation thereof is omitted.

As indicated in FIG. 7, an optical transmission apparatus 210 in the second embodiment has a circulator 213 in place of the optical coupler 113 indicated in FIG. 2. Moreover, an optical receiving apparatus 230 in the second embodiment has a circulator 235 and an optical coupler 232 in place of the optical coupler 132 indicated in FIG. 2. Furthermore, the optical receiving apparatus 230 in the second embodiment has a modulating unit 234 in place of the modulating unit 134 indicated in FIG. 2.

The circulator 213 outputs the signal light S1 that is input from the signal-light transmitting unit 112 to the optical connector 111. Moreover, when receiving, from the optical connector 111, input of the modulation light S2 that returns to the optical transmission apparatus 210 from the optical receiving apparatus 230 as return light, the circulator 213 branches the input modulation light S2, and outputs the branched modulation light S2 to the photoelectric converter 114.

The photoelectric converter 114 converts the modulation light S2 that is input from the circulator 213 into an electric signal, and outputs the modulation signal S2 that has been converted into an electric signal to the modulation-light-voltage extracting unit 115.

The circulator 235 outputs the signal light S1 that is input from the optical connector 131 to the optical coupler 232. Furthermore, the circulator 235 outputs the modulation light S2 input from the modulating unit 234 to the optical connector 131 as return light. The modulation light S2 output to the optical connector 131 by the circulator 235 is output to the optical transmission apparatus 210 through the optical fiber 10. The circulator 235 is an example of an output unit that outputs the modulation light S2 to the optical transmission apparatus 210 as return light.

The optical coupler 232 branches the signal light S1 that is input from the circulator 235, and outputs one of signal lights obtained as a result of branching to the signal-light receiving unit 133, while outputting the other one of the signal lights obtained as a result of branching (hereinafter, "branched light") to the modulating unit 234.

The signal-light receiving unit 133 receives the signal light input from the optical coupler 232, and performs predetermined signal processing on the received signal light.

The modulating unit 234 modulates a part of the signal light S1 that is transmitted from the optical transmission apparatus 210. Specifically, the modulating unit 234 includes an intensity-modulation signal generator 234a and a VOA 234b.

The intensity-modulation signal generator 234a generates an intensity modulation signal that is an electric signal to perform intensity modulation on signal light, and outputs the generated intensity modulation signal to the VOA 234b. The intensity modulation signal generated by the intensity-modulation signal generator 234a is an electric signal that has a frequency sufficiently lower than that of signal light, and is an electric signal that repeats attenuation and amplification at predetermined time intervals.

The VOA 234b modulates the intensity of the branched light input from the optical coupler 232 using the intensity modulation signal that is input from the intensity-modulation signal generator 234a. Specifically, the VOA 234b modulates the intensity of the branched light by attenuating or amplifying the branched light at predetermined time intervals according to the intensity modulation signal. The VOA 234b then outputs the branched light subjected to the intensity modulation to the circulator 235 as the modulation light S2.

Figure 8:
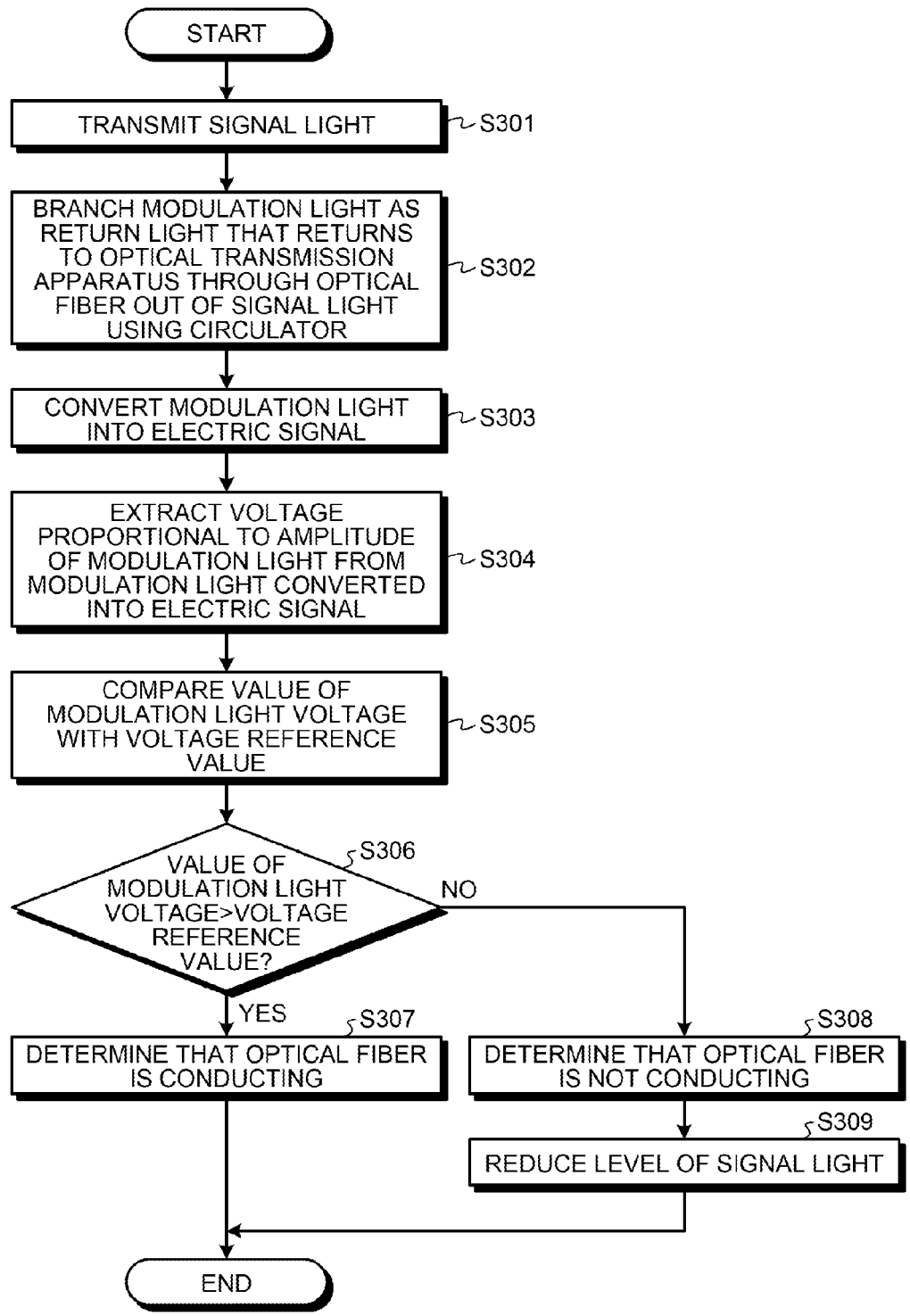
FIG. 8 is a flowchart indicating a processing procedure of a continuity determination processing performed by the optical transmission apparatus in the second embodiment.

Next, an example of continuity determination processing performed by the optical transmission apparatus 210 in the second embodiment is explained using FIG. 8. FIG. 8 is a flowchart indicating a processing procedure of the continuity determination processing performed by the optical transmission apparatus in the second embodiment. Steps S301 and S303 to S309 indicated in FIG. 8 correspond to steps S101 and S103 to S109 indicated in FIG. 5, and therefore, detailed explanation thereof is omitted.

As indicated in FIG. 8, the circulator 213 branches the modulation light S2 as return light that returns to the optical transmission apparatus 210 from the optical receiving apparatus 230 (step S302). The circulator 213 outputs the branched modulation light S2 to the photoelectric converter 114.

Figure 9:
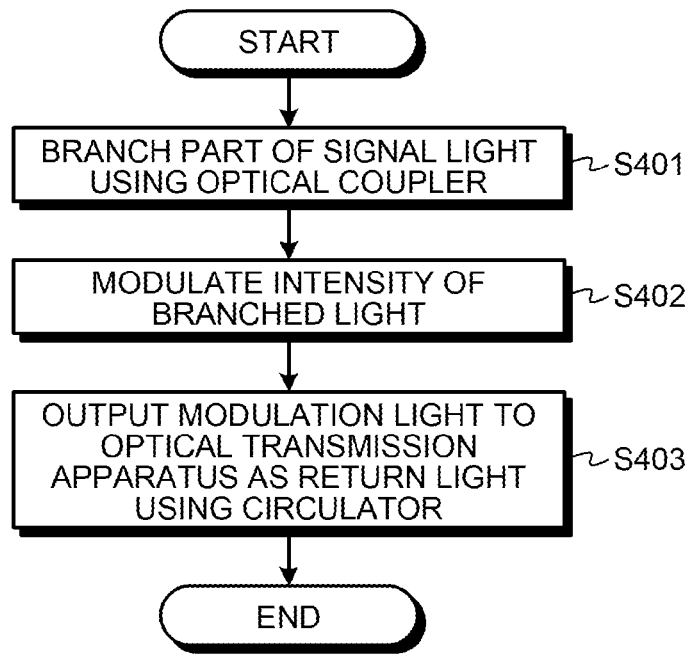
FIG. 9 is a flowchart indicating a processing procedure of a return-light output processing performed by the optical receiving apparatus in the second embodiment.

Next, an example of return-light output processing performed by the optical receiving apparatus 230 in the second embodiment is explained using FIG. 9. FIG. 9 is a flowchart indicating a processing procedure of the return-light output processing performed by the optical receiving apparatus in the second embodiment.

As indicated in FIG. 9, the optical coupler 232 of the optical receiving apparatus 230 branches a part of the signal light S1 input from the circulator 235, and outputs branched light obtained as a result of branching to the modulating unit 234 (step S401).

The VOA 234b of the modulating unit 234 modulates the intensity of the branched light input from the optical coupler 232 using the intensity modulation signal that is input from the intensity-modulation signal generator 234a (step S402). The VOA 234b outputs the branched light subjected to the intensity modulation to the circulator 235 as the modulation light S2.

The circulator 235 outputs the modulation light S2 input from the modulating unit 234 to the optical transmission apparatus 210 as return light (step S403).

As described above, the optical transmission system according to the second embodiment uses the circulator 213 and the circulator 235 as optical parts to output or branch return light. Therefore, according to the second embodiment, it is possible to determine continuity of the optical fiber 10 accurately, and to suppress loss of return light compared to a case in which an optical coupler is used to output and branch the return light.

[c] Third Embodiment

Figure 10:
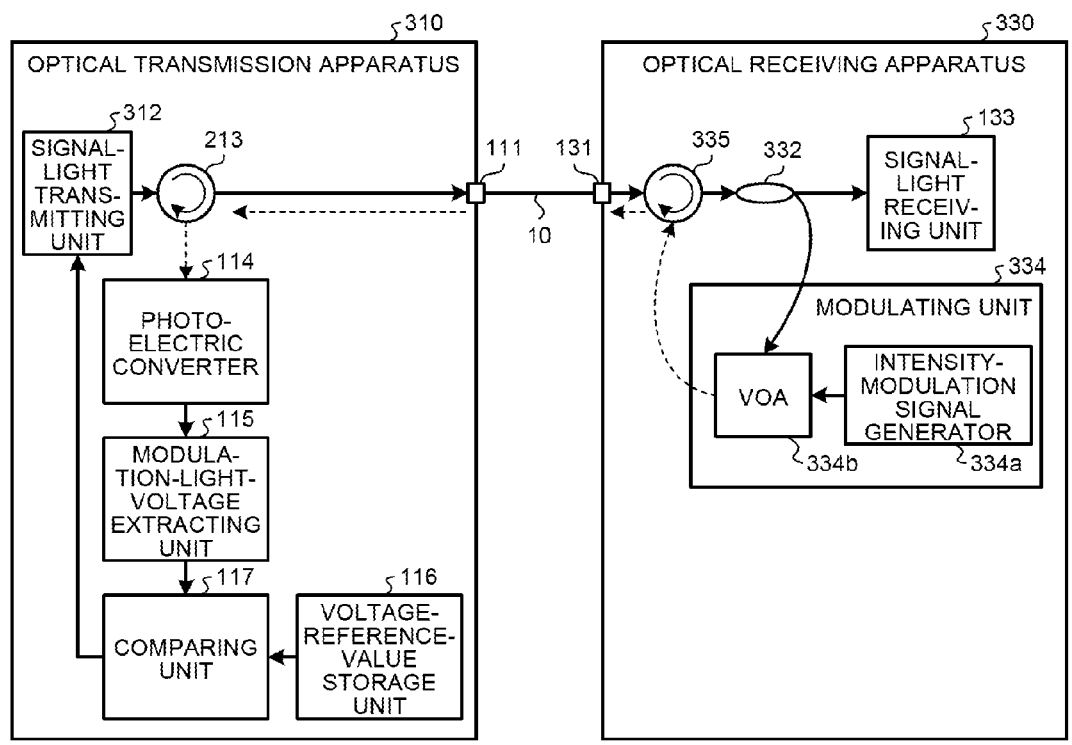
FIG. 10 indicates a configuration example of an optical transmission apparatus and an optical receiving apparatus that are included in an optical transmission system according to a third embodiment.

Next, an optical transmission system according to a third embodiment is explained using FIG. 10. FIG. 10 indicates a configuration example of an optical transmission apparatus and an optical receiving apparatus that are included in the optical transmission system according to the third embodiment. The optical transmission system according to the third embodiment only differs in a method of generating the modulation light S2 from the optical transmission system according to the second embodiment, and other components are the same as the optical transmission system according to the second embodiment. Accordingly, in the following, like reference symbols are given to components same as the second embodiment, and explanation thereof is omitted.

As indicated in FIG. 10, an optical transmission apparatus 310 has a signal-light transmitting unit 312 in place of the signal-light transmitting unit 112 indicated in FIG. 7. Moreover, an optical receiving apparatus 330 in the third embodiment has a circulator 335 and a wavelength-division multiplexing (WDM) coupler 332 in place of the circulator 235 and the optical coupler 232 indicated in FIG. 7. Furthermore, the optical receiving apparatus 330 has a modulating unit 334 in place of the modulating unit 234 indicated in FIG. 7.

The signal-light transmitting unit 312 transmits the signal light S1 to the optical receiving apparatus 330 that is connected to the optical transmission apparatus 310 through the optical fiber 10. The signal light S1 includes main signal light and amplified spontaneous emission (ASE) light that is generated by an optical amplifier built in the signal-light transmitting unit 312. The ASE light includes ASE light that is present in a waveband same as that of the main signal light, and ASE light that is present in a waveband different from that of the main signal light. That is, the signal light S1 includes ASE light that is present in a waveband different from that of the main signal light in addition to the main signal light. The ASE light present in a waveband different from that of the main signal light is an example of optical components that are present in a waveband different from that of the main signal light.

The circulator 213 outputs the signal light S1 that is input from the signal-light transmitting unit 312 to the optical connector 111. Moreover, when receiving, from the optical connector 111, input of the modulation light S2 that returns to the optical transmission apparatus 310 from the optical receiving apparatus 330 as return light, the circulator 213 branches the input modulation light S2, and outputs the branched modulation light S2 to the photoelectric converter 114.

The circulator 335 outputs the signal light S1 that is input from the optical connector 131 to the WDM coupler 332. Furthermore, the circulator 335 outputs the modulation light S2 input from the modulating unit 334 to the optical connector 131 as return light. The modulation light S2 output to the optical connector 131 by the circulator 335 is output to the optical transmission apparatus 310 through the optical fiber 10. The circulator 335 is an example of an output unit that outputs the modulation light S2 to the optical transmission apparatus 310 as return light.

The WDM coupler 332 separates the ASE light that is present in a waveband different from that of the main signal light, and outputs the separated ASE light (hereinafter, "separated ASE light") to the modulating unit 334. Moreover, the WDM coupler 332 outputs remaining signal light that does not include the separated ASE light to the signal-light receiving unit 133.

Figure 11:
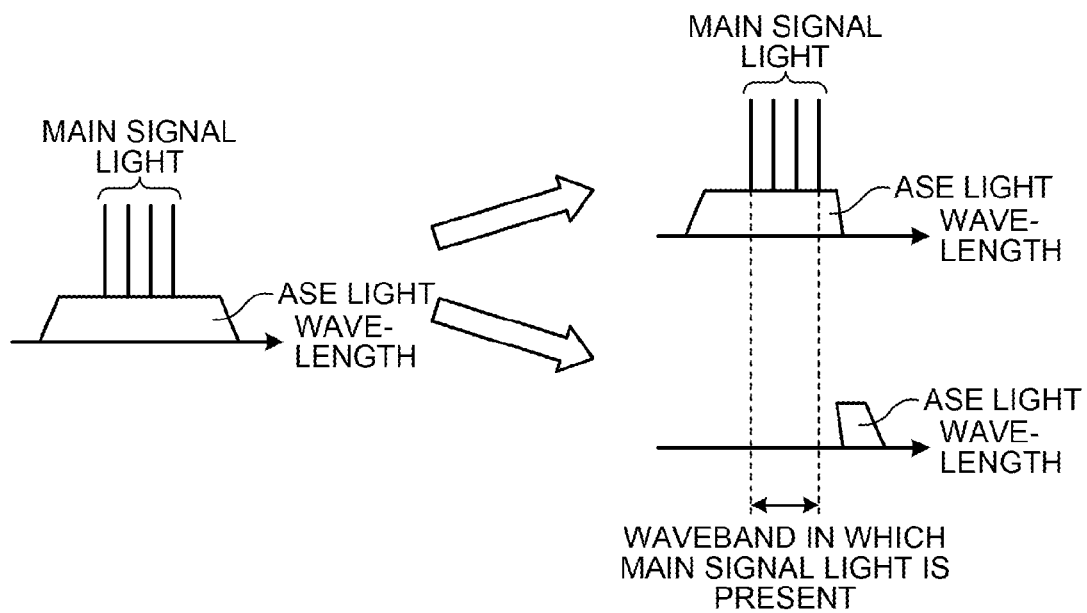
FIG. 11 is a diagram for explaining an example of an amplified-spontaneous-emission (ASE)-light division processing in the third embodiment.

An example of ASE-light division processing performed by the WDM coupler 332 is explained. FIG. 11 is a diagram for explaining an example of the ASE-light division processing in the third embodiment.

As indicated in a left part of FIG. 11, the main signal light and the signal light S1 including the ASE light are input to the WDM coupler 332 from the circulator 335. The WDM coupler 332 then outputs, from the signal light S1, the ASE light that is present in a waveband different from that of the main signal light to the modulating unit 334 as the separated ASE light as indicated in a lower right part of FIG. 11. Furthermore, the WDM coupler 332 outputs signal light from which the separated ASE light is separated to the signal-light receiving unit 133 as indicated in an upper right part of FIG. 11.

Returning back to explanation of FIG. 10, The signal-light receiving unit 133 receives the signal light input from the WDM coupler 332, and performs predetermined signal processing on the received signal light.

The modulating unit 334 modulates a part of the signal light S1 that is transmitted from the optical transmission apparatus 310. Specifically, the modulating unit 334 includes an intensity-modulation signal generator 334a and a VOA 334b.

The intensity-modulation signal generator 334a generates an intensity modulation signal that is an electric signal to perform intensity modulation on signal light, and outputs the generated intensity modulation signal to the VOA 334b. The intensity modulation signal generated by the intensity-modulation signal generator 334a is an electric signal having a frequency sufficiently lower than signal light, and is an electric signal that repeats attenuation or amplification at predetermined time intervals.

The VOA 334b modulates the intensity of the separated ASE light that is input from the WDM coupler 332 using the intensity modulation signal input from the intensity-modulation signal generator 334a. Specifically, the VOA 334b modulates the intensity of the separated ASE light by attenuating or amplifying the separated ASE light at predetermined time intervals according to the intensity modulation signal. The VOA 334b then outputs the separated ASE light subjected to the intensity modulation to the circulator 335 as the modulation light S2.

Figure 12:
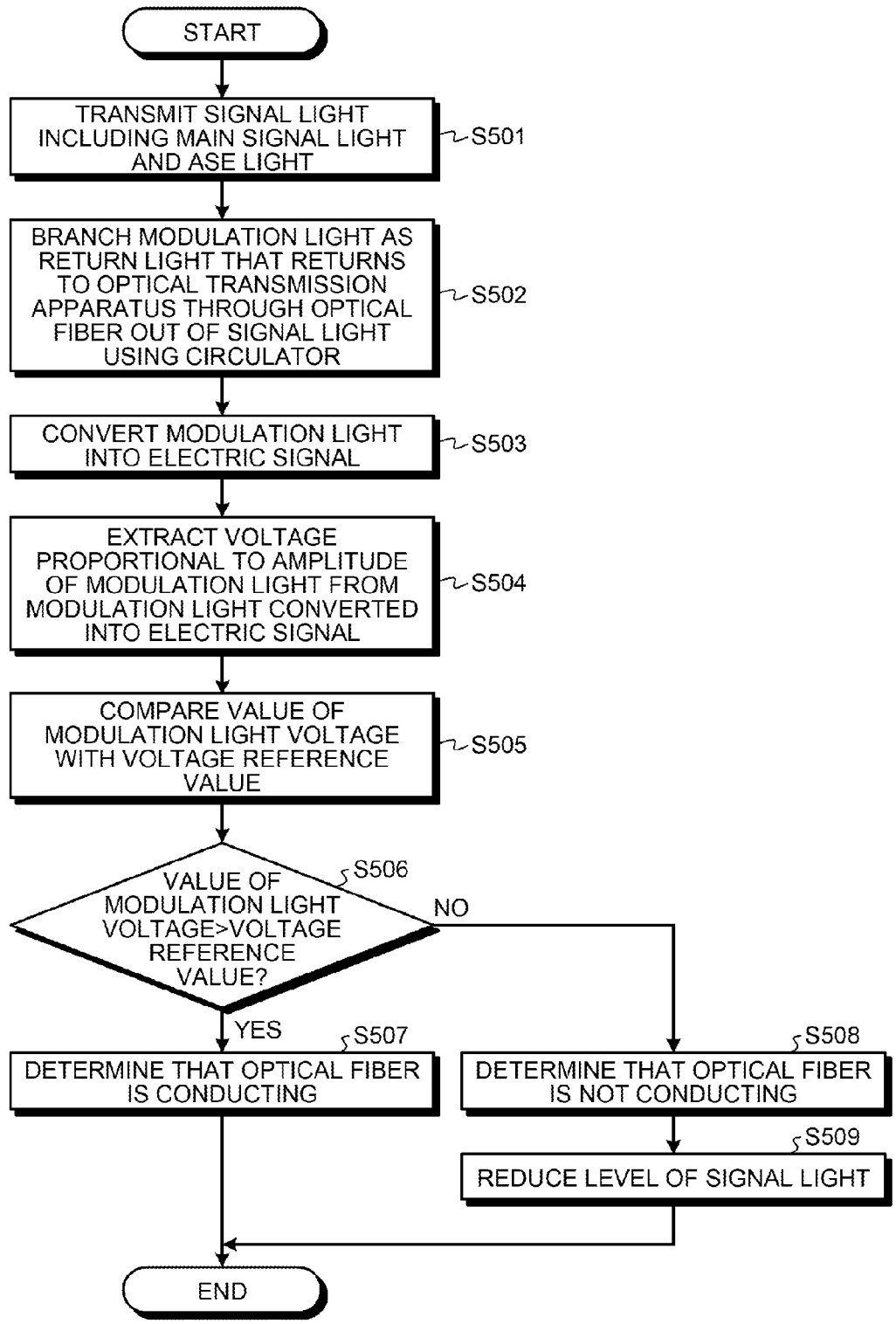
FIG. 12 is a flowchart indicating a processing procedure of a continuity determination processing performed by the optical transmission apparatus in the third embodiment.

Next, an example of continuity determination processing performed by the optical transmission apparatus 310 in the third embodiment is explained using FIG. 12. FIG. 12 is a flowchart indicating a processing procedure of the continuity determination processing performed by the optical transmission apparatus in the third embodiment. Steps S502 to S509 indicated in FIG. 12 correspond to steps S302 to S309 indicated in FIG. 8, and therefore, detailed explanation thereof is omitted.

As indicated in FIG. 12, the signal-light transmitting unit 312 of the optical transmission apparatus 310 transmits the signal light S1 that includes the main signal light and the ASE light present in a waveband different from that of the main signal light to the optical receiving apparatus 330 that is connected to the optical transmission apparatus 310 through the optical fiber 10 (step S501).

Figure 13:
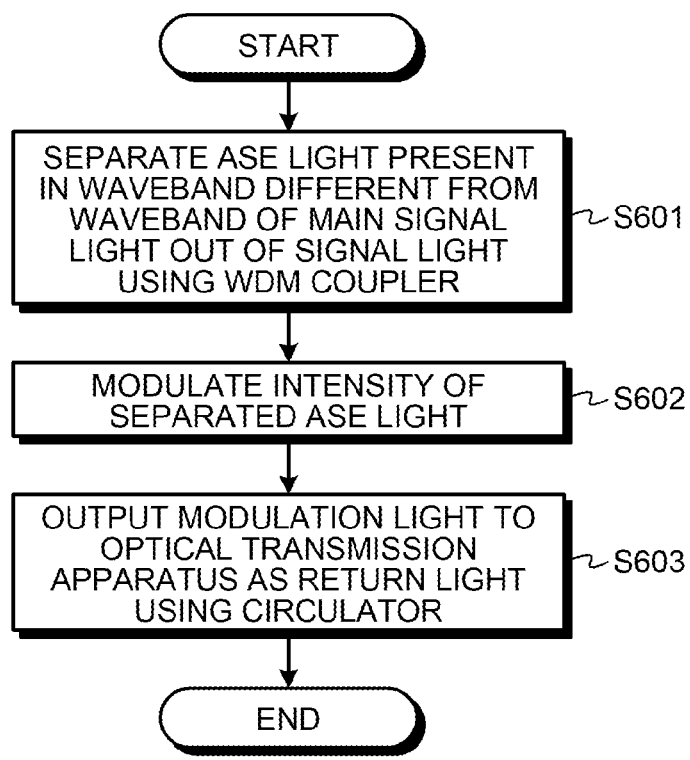
FIG. 13 is a flowchart indicating a processing procedure of a return-light output processing performed by the optical receiving apparatus in the third embodiment.

Next, an example of return-light output processing performed by the optical receiving apparatus 330 in the third embodiment is explained using FIG. 13. FIG. 13 is a flowchart indicating a processing procedure of the return-light output processing performed by the optical receiving apparatus in the third embodiment.

As indicated in FIG. 13, the WDM coupler 332 of the optical receiving apparatus 330 separates ASE light that is present in a waveband different from that of the main signal light from the signal light S1 that is input from the circulator 335, and outputs the separated ASE light to the modulating unit 334 (step S601).

The VOA 334b of the modulating unit 334 modulates the intensity of the separated ASE light that is input from the WDM coupler 332 using the intensity modulation signal that is input from the intensity-modulation signal generator 334a (step S602). The VOA 334b outputs the separated ASE light subjected to the intensity modulation to the circulator 335 as the modulation light S2.

The circulator 335 outputs the modulation light S2 input from the modulating unit 334 to the optical transmission apparatus 310 as return light (step S603).

As described above, in the optical transmission system according to the third embodiment, the optical receiving apparatus 330 modulates the ASE light that is present in a waveband different from that of the main signal light as a part of the signal light S1, and outputs the modulation light S2 that is obtained by modulating the ASE light to the optical transmission apparatus 310 as return light. Therefore, according to the third embodiment, it is possible to determine continuity of the optical fiber 10 accurately, and to suppress loss of the main signal light included in the signal light.

[d] Fourth Embodiment

Figure 14:
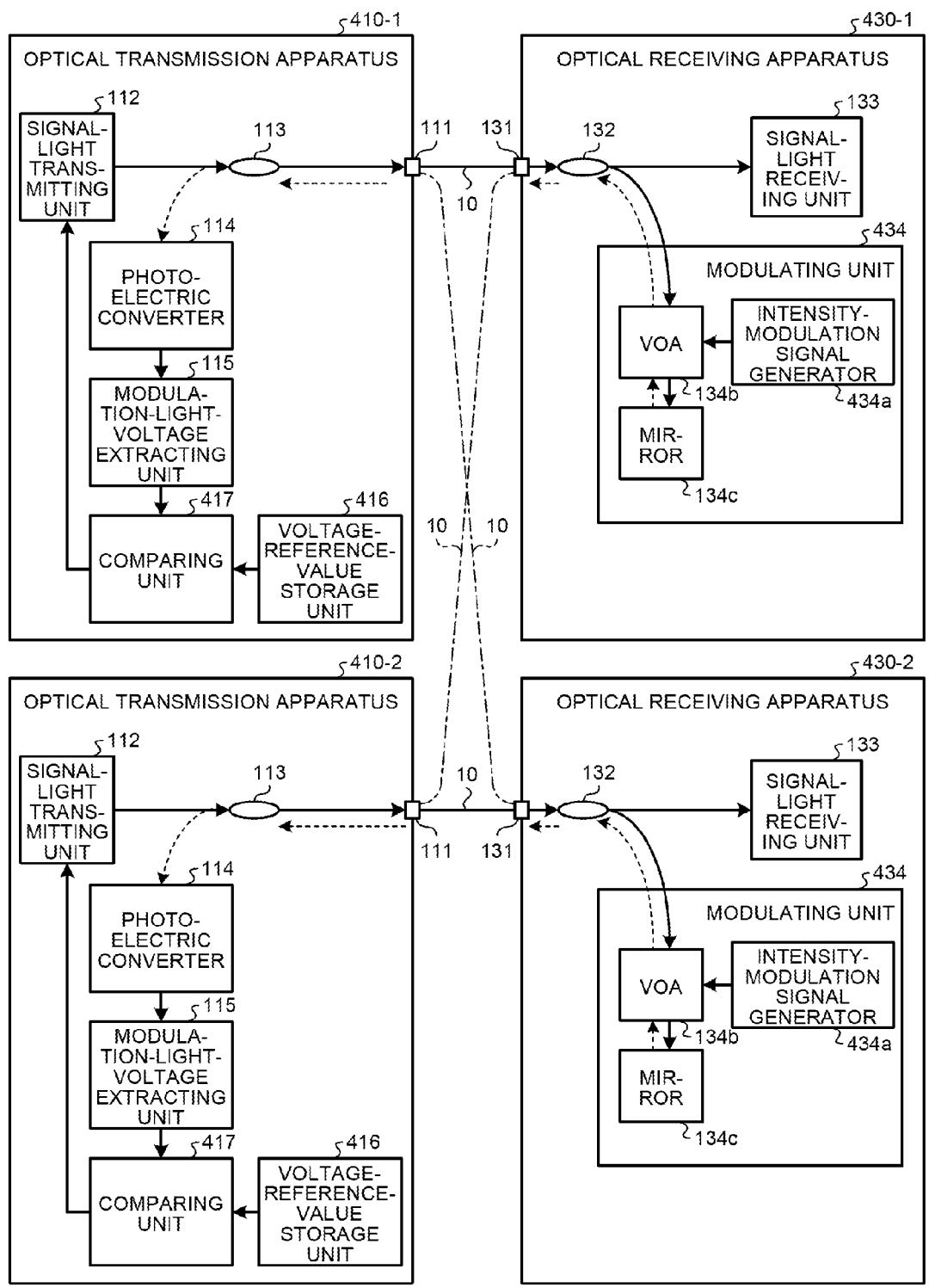
FIG. 14 indicates a configuration example of an optical transmission apparatus and an optical receiving apparatus that are included in an optical transmission system according to a fourth embodiment.

Next, an optical transmission system according to a fourth embodiment is explained using FIG. 14. FIG. 14 indicates a configuration example of an optical transmission apparatus and an optical receiving apparatus that are included in the optical transmission system according to the fourth embodiment. The optical transmission system according to the fourth embodiment only differs in that the optical transmission apparatus makes determination about an optical receiving apparatus to be a destination to which the own apparatus is connected out of multiple optical receiving apparatuses from the optical transmission system according to the first embodiment, and other components are the same as the optical transmission system according to the first embodiment. Accordingly, in the following, like reference symbols are given to components same as the first embodiment, and explanation thereof is omitted.

As indicated in FIG. 14, the optical transmission system according to the fourth embodiment includes optical transmission apparatuses 410-1, 410-2, and optical receiving apparatuses 430-1, 430-2. In the following, when the optical transmission apparatus 410-1 and the optical receiving apparatus 430-1 are connected through the optical fiber 10 and the optical transmission apparatus 410-2 and the optical receiving apparatus 430-2 are connected through the optical fiber 10 as indicated by solid lines in FIG. 14, connection in the optical transmission system is in appropriate connection. On the other hand, when the optical transmission apparatus 410-1 and the optical receiving apparatus 430-2 are connected through the optical fiber and the optical transmission apparatus 410-2 and the optical receiving apparatus 430-1 are connected through the optical fiber 10 as indicated by alternate long and short dashed lines in FIG. 14, connection in the optical transmission system is in false connection.

Although two units of the optical transmission apparatuses and two units of the optical receiving apparatuses are illustrated in the example in FIG. 14, the number of units of the optical transmission apparatuses and the optical receiving apparatuses are not limited to two.

As indicated in FIG. 14, each of the optical transmission apparatuses 410-1 and 410-2 in the fourth embodiment includes a voltage-reference-value storage unit 416, and a comparing unit 417 in place of the voltage-reference-value storage unit 116 and the comparing unit 117 indicated in FIG. 2. Moreover, each of the optical receiving apparatuses 430-1 and 430-2 in the fourth embodiment includes a modulating unit 434 in place of the modulating unit 134 indicated in FIG. 2.

The modulating unit 434 equipped in each of the optical receiving apparatuses 430-1 and 430-2 modulates a part of the signal light S1 that is transmitted from the optical transmission apparatuses 410-1 and 410-2, to generate the modulation light S2 that differs for each optical receiving apparatus. For example, the modulating unit 434 of the optical receiving apparatus 430-1 and the modulating unit 434 of the optical receiving apparatus 430-2 respectively generate the intensity modulation signals having different frequencies or patterns by an intensity-modulation signal generator 434a. The modulating unit 434 of the optical receiving apparatus 430-1 and the modulating unit 434 of the optical receiving apparatus 430-2 respectively modulate the intensity of the branched light input from the optical coupler 132 using the intensity modulation signal having different frequencies or patterns. Thus, the modulation signals S2 different for each optical receiving apparatus are generated.

The optical coupler 132 that is equipped in each of the optical receiving apparatuses 430-1 and 430-2 branches the signal light S1 input from the optical connector 131, and outputs one of signal light obtained as a result of branching to the signal-light receiving unit 133. The optical coupler 132 that is equipped in each of the optical receiving apparatuses 430-1 and 430-2 outputs the other one of signal light obtained as a result of branching (hereinafter, "branched light") to the modulating unit 434. Moreover, the optical coupler 132 that is equipped in each of the optical receiving apparatuses 430-1 and 430-2 outputs the modulation light S2 that is different for each optical receiving apparatus input from the modulating unit 434 to the optical connector 131 as return light.

The voltage-reference-value storage unit 416 equipped in each of the optical transmission apparatuses 410-1 and 410-2 stores voltage reference value different for each optical receiving apparatus.

The comparing unit 417 equipped in each of the optical transmission apparatuses 410-1 and 410-2 basically has similar functions as the comparing unit 117 indicated in FIG. 2. The comparing unit 417 equipped in each of the optical transmission apparatuses 410-1 and 410-2 makes determination for an optical receiving apparatus to be a destination to which the own apparatus is connected out of the optical receiving apparatuses 430-1 and 430-2, using the modulation light S2 that returns to the optical transmission apparatus as return light and is different for each optical receiving apparatus. That is, the comparing unit 417 equipped in each of the optical transmission apparatuses 410-1 and 410-2 selects one of the voltage reference values different for each optical receiving apparatus stored in the voltage-reference-value storage unit 416. At this time, the comparing unit 417 equipped in each of the optical transmission apparatuses 410-1 and 410-2 selects one of the voltage reference values different for each optical receiving apparatus in descending order from the maximum voltage reference value to the minimum voltage reference value. The comparing unit 417 equipped in each of the optical transmission apparatuses 410-1 and 410-2 then compares the value of the modulation light voltage extracted by the modulation-light-voltage extracting unit 115 with the selected voltage reference value. When the value of the modulation light voltage is larger than the voltage reference value, the comparing unit 417 equipped in each of the optical transmission apparatuses 410-1 and 410-2 determines that the optical receiving apparatus corresponding to the selected voltage reference value is the destination to be connected. For example, when the value of the modulation light voltage is larger than the voltage reference value corresponding to the optical receiving apparatus 430-1, the comparing unit 417 equipped in the optical transmission apparatus 410-1 determines that the optical receiving apparatus 430-1 corresponding to the selected voltage reference value is the destination to be connected. On the other hand, when the value of the modulation light voltage is equal to or smaller than the voltage reference value, the comparing unit 417 equipped in each of the optical transmission apparatuses 410-1 and 410-2 selects another voltage reference value smaller than the voltage reference value that has been selected, and compares the value of the modulation light voltage with the selected voltage reference value. The comparing unit 417 equipped in each of the optical transmission apparatuses 410-1 and 410-2 determines that the optical fiber 10 is not conducting when all of the voltage reference values have been selected.

Figure 15:
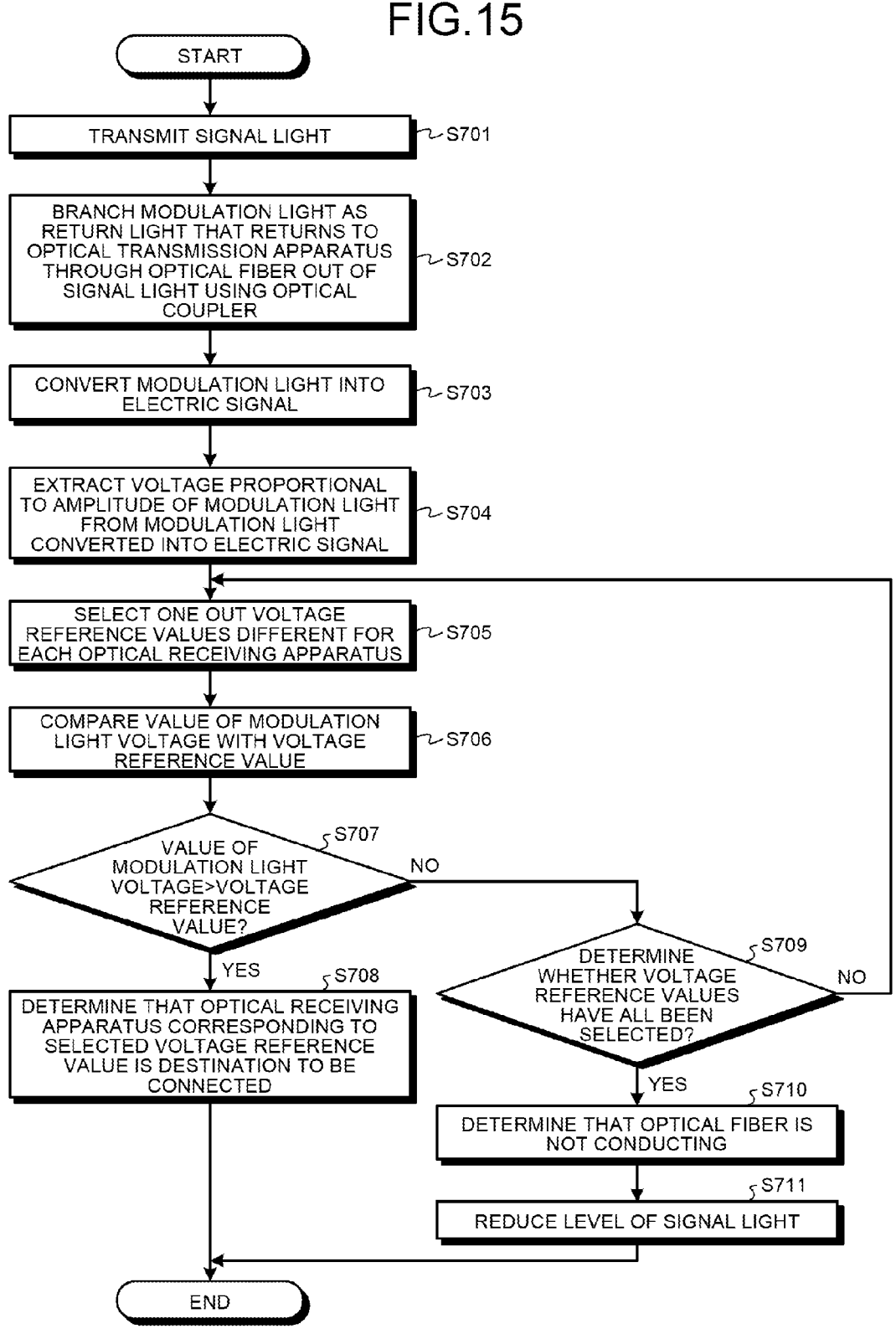
FIG. 15 is a flowchart indicating a processing procedure of a connection-destination determination processing performed by the optical receiving apparatus in the fourth embodiment.

Next, an example of connection-destination determination processing performed by the optical transmission apparatus 410-1 in the fourth embodiment is explained using FIG. 15. FIG. 15 is a flowchart indicating a processing procedure of the connection-destination determination processing performed by the optical receiving apparatus in the fourth embodiment. The connection-destination determination processing performed by the optical transmission apparatus 410-2 is the same as the connection-destination determination processing performed by the optical transmission apparatus 410-1, and therefore, explanation thereof is omitted.

As indicated in FIG. 15, the signal-light transmitting unit 112 of an optical transmission apparatus 410 transmits the signal light S1 to the optical receiving apparatus 430-1 that is connected to the optical transmission apparatus 410 through the optical fiber 10 (step S701).

The optical coupler 113 branches the modulation light S2 as return light that returns to the optical transmission apparatus 410 from an optical receiving apparatus 430 (step S702). The optical coupler 113 outputs the branched modulation light S2 to the photoelectric converter 114.

The photoelectric converter 114 converts the modulation light S2 input from the optical coupler 113 into an electric signal (step S703). The photoelectric converter 114 outputs the modulation light S2 converted into an electric signal to the modulation-light-voltage extracting unit 115.

The modulation-light-voltage extracting unit 115 extracts, from the modulation light S2 converted into an electric signal, voltage proportional to amplitude of the modulation light S2, that is, the modulation light voltage (step S704).

The comparing unit 417 selects one of the voltage reference values different for each optical receiving apparatus stored in the voltage-reference-value storage unit 416 (step S705). At this time, the comparing unit 417 selects one of the voltage reference values different for each optical receiving apparatus in descending order from the maximum voltage reference value to the minimum voltage reference value. The comparing unit 417 compares the value of the modulation light voltage extracted by the modulation-light-voltage extracting unit 115 with the selected voltage reference value (step S706).

When the value of the modulation light voltage is larger than the voltage reference value (step S707: YES), the comparing unit 417 determines that the optical receiving apparatus corresponding to the selected voltage reference value is a destination to be connected (step S708).

On the other hand, when the value of the modulation light voltage is equal to or smaller than the voltage reference value (step S707: NO), the comparing unit 417 determines whether all of the voltage reference values have been selected (step S709). When the voltage reference values have not all been selected (step S709), the comparing unit 417 returns to the processing at step S705.

On the other hand, when the voltage reference values have all been selected (step S709: YES), the comparing unit 417 determines that the optical fiber 10 is not conducting, and outputs the determination result to the display unit (step S710). Furthermore, the comparing unit 417 instructs the signal-light transmitting unit 112 to reduce the level of the signal light S1. The signal-light transmitting unit 112 reduces the level of the signal light S1 based on the instruction from the comparing unit 417 (step S711).

As described above, in the optical transmission system according to the fourth embodiment, the optical transmission apparatus makes determination for the optical receiving apparatus to be a destination to which the own apparatus is connected out of the multiple optical receiving apparatuses using the modulation light S2 that returns to the optical transmission apparatus as return light and that is different for each optical receiving apparatus. Therefore, according to the fourth embodiment, it is possible to determine continuity of the optical fiber 10 accurately, and to determine false connection between the optical transmission apparatus and the optical receiving apparatus accurately.

According to one mode of the optical transmission system disclosed in the present application, such an effect can be obtained that conductivity of an optical transmission path can be accurately determined.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
   an optical transmission apparatus; and
   an optical receiving apparatus, wherein
   the optical transmission apparatus includes
      a transmitting unit that transmits signal light to the optical receiving apparatus that is connected to the optical transmission apparatus through an optical transmission path; and
      a determining unit that determines continuity of the optical transmission path using return light out of the signal light, the return light returning from the optical receiving apparatus to the optical transmission apparatus through the optical transmission path, and
   the optical receiving apparatus includes
      a mirror that reflects branched light obtained by a part of the signal light being branched and outputs reflected light obtained by the branched light being reflected to the optical transmission apparatus as the return light, and
      a modulating unit that modulates the return light by attenuating the branched light or the reflected light or a combination thereof.

2. The optical transmission system according to claim 1, wherein
   the signal light includes, in addition to main signal light, an optical component that is present in a waveband different from that of the main signal light,
   the modulating unit modulates the optical component present in the waveband different from that of the main signal light as the return light, the optical component branched out from the signal light, and
   the mirror reflects the optical component and outputs reflected light obtained by the optical component being reflected to the optical transmission apparatus as the return light.

3. The optical transmission system according to claim 1, wherein
   the optical transmission system includes a plurality of the optical transmission apparatuses and a plurality of the optical receiving apparatuses,
   the modulating unit that is equipped in each of the plurality of the optical receiving apparatuses modulates the part of the signal light to generate the modulation light that is different for each of the plurality of the optical receiving apparatuses,
   the mirror that is equipped in each of the plurality of the optical receiving apparatuses outputs the modulation light that is different for each of the plurality of the optical receiving apparatuses to the optical transmission apparatus to be a destination to which each of the plurality of the optical receiving apparatuses is connected as the return light, and the determining unit that is equipped in each of the plurality of the optical transmission apparatuses determines the optical receiving apparatus to be a destination to which the optical transmission apparatus is connected out of the plurality of the optical receiving apparatuses using the modulation light that returns to the optical transmission apparatus as the return light and that is different for each of the plurality of the optical receiving apparatuses.

4. An optical transmission system comprising:

an optical transmission apparatus; and an optical receiving apparatus, wherein the optical transmission apparatus includes a transmitting unit that transmits signal light to the optical receiving apparatus that is connected to the optical transmission apparatus through an optical transmission path; and a determining unit that determines continuity of the optical transmission path using return light out of the signal light, the return light returning from the optical receiving apparatus to the optical transmission apparatus through the optical transmission path, and the optical receiving apparatus includes a modulating unit that modulates a part of the signal light that is transmitted from the optical transmission apparatus; and an output unit that outputs modulation light that is obtained by the part of the signal light being modulated to the optical transmission apparatus as the return light, wherein the determining unit includes a converting unit that converts the modulation light returning to the optical transmission apparatus as the return light into an electric signal;

an extracting unit that extracts, from the modulation light converted into the electric signal, voltage that is proportional to amplitude of the modulation light; and a comparing unit that performs comparison between a value of the voltage and a predetermined reference value, and that outputs a result of the comparison as a result of determination of continuity of the optical transmission path, wherein the comparing unit instructs the transmitting unit to reduce a level of the signal light when the value of the voltage is equal to or smaller than the predetermined reference value.

5. An optical receiving apparatus comprising:

a mirror that reflects, when an optical transmission apparatus transmits signal light to the optical receiving apparatus that is connected to the optical transmission apparatus through an optical transmission path and determines continuity of the optical transmission path using return light that returns to the optical transmission apparatus from the optical receiving apparatus through the optical transmission path out of the transmitted signal light, branched light obtained by a part of the signal light being branched and outputs reflected light obtained by the branched light being reflected to the optical transmission apparatus as the return light, and a modulating unit that modulates the return light by attenuating the branched light or the reflected light or a combination thereof.

6. The optical receiving apparatus according to claim 5, wherein the signal light includes main signal light and an optical component that is present in a waveband different from that of the main signal light, the modulating unit modulates the optical component that is branched out from the signal light and is present in the waveband different from that of the main signal light, as the return light, and the mirror reflects the optical component and outputs reflected light obtained by the optical component being reflected to the optical transmission apparatus as the return light.

* * * * *